US008092140B2

(12) United States Patent
Baker et al.

(10) Patent No.: US 8,092,140 B2
(45) Date of Patent: Jan. 10, 2012

(54) METHOD AND APPARATUS FOR CONTAINER STORAGE AND CONTAINER RETRIEVAL

(75) Inventors: John Russell Baker, Auckland (NZ); Sandra Louise Tulisi, Benowa Waters (AU); Alan Sydney Calvert, Waimauku (NZ)

(73) Assignee: Bakvertisi Limited, Auckland (NZ)

( * ) Notice: Subject to any disclaimer, the term of this patent is extended or adjusted under 35 U.S.C. 154(b) by 0 days.

(21) Appl. No.: 11/820,520

(22) Filed: Jun. 19, 2007

(65) Prior Publication Data

US 2008/0025833 A1 Jan. 31, 2008

Related U.S. Application Data

(63) Continuation of application No. 10/466,850, filed on Feb. 18, 2004, now abandoned.

(30) Foreign Application Priority Data

Jan. 26, 2001 (NZ) .......................... 509626
Jun. 1, 2001 (NZ) .......................... 512165

(51) Int. Cl.
*B65G 1/04* (2006.01)
(52) U.S. Cl. ........ 414/268; 414/272; 414/278; 414/281; 414/285; 414/807; 198/347.4; 198/418.5; 700/216; 700/217
(58) Field of Classification Search .................. 414/268, 414/269, 272, 278, 281, 285, 790.6, 807; 198/347.4, 418.5, 436, 456, 890, 890.1; 700/216–218
See application file for complete search history.

(56) References Cited

U.S. PATENT DOCUMENTS

| | | | |
|---|---|---|---|
| 2,743,826 A | 5/1956 | Aschenwald | |
| 3,448,870 A * | 6/1969 | Boissevain et al. | 414/273 |
| 3,511,357 A | 5/1970 | Vanderhoof | |
| 3,749,225 A | 7/1973 | Kennedy | |
| 4,552,262 A | 11/1985 | Murakami et al. | |
| 4,553,658 A | 11/1985 | Gasser | |
| 4,610,360 A | 9/1986 | Forslund | |
| 4,813,847 A * | 3/1989 | De Vries | 414/807 |
| 5,328,316 A | 7/1994 | Hoffmann | |
| 5,363,310 A * | 11/1994 | Haj-Ali-Ahmadi et al. | 700/216 |
| 5,379,229 A | 1/1995 | Parsons et al. | |

(Continued)

FOREIGN PATENT DOCUMENTS

AU 199716347 5/1997

(Continued)

*Primary Examiner* — James Keenan
(74) *Attorney, Agent, or Firm* — Merchant & Gould P.C.

(57) ABSTRACT

A container storage and retrieval system (1) has first, second and third storage zones (2, 3, 4) for storing containers. The first storage zone (2) stores containers of product in frames (6), each frame (6) including a plurality of stacks (7) of containers. The second storage zone (3) stores containers of product in stacks (7). An automated retrieval system retrieves selected stacks of containers from the second storage zone (3) and replenishes the second zone (3) with containers by receiving frames (6). The third storage zone (4) includes a second automated retrieval system for retrieving selected partial stacks or stacks of containers, and replenishing the third storage zone with containers by receiving stacks from the second storage zone. Orders are collated by transferring a required number of complete frames (6) from the first storage zone (2), a required number of complete stacks (7) from the second storage zone (3) and a required number of stacks (7) or partial stacks from the third zone (4).

11 Claims, 15 Drawing Sheets

U.S. PATENT DOCUMENTS

| | | | |
|---|---|---|---|
| 5,395,206 A * | 3/1995 | Cerny, Jr. | 414/807 |
| 5,415,520 A | 5/1995 | Seiver | |
| 5,564,890 A * | 10/1996 | Knudsen, Jr. | 414/807 |
| 5,636,966 A | 6/1997 | Lyon et al. | |
| 5,664,928 A * | 9/1997 | Stauber | 414/269 |
| 5,765,984 A | 6/1998 | Stefano et al. | |
| 6,053,301 A | 4/2000 | Kamei | |
| 6,061,607 A | 5/2000 | Bradley et al. | |
| 6,289,260 B1 * | 9/2001 | Bradley et al. | 700/216 |
| 6,450,751 B1 * | 9/2002 | Hollander | 414/268 |
| 6,481,559 B1 | 11/2002 | Maeda et al. | |
| 6,505,094 B2 * | 1/2003 | Pape et al. | 700/217 |
| 6,609,605 B1 | 8/2003 | Linder | |
| 6,782,990 B2 | 8/2004 | Joutsjoki et al. | |

FOREIGN PATENT DOCUMENTS

| | | |
|---|---|---|
| JP | 63-166240 | 7/1988 |
| WO | WO 94/24032 | 10/1994 |

\* cited by examiner

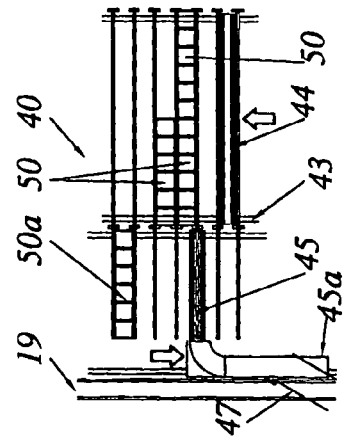
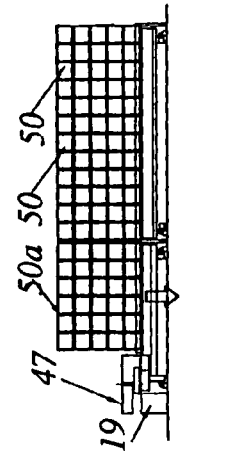
Fig 2A. Fig 2B. Fig 2C.
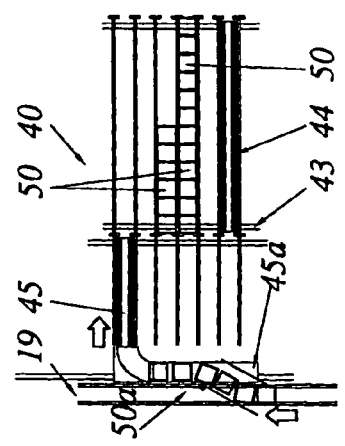
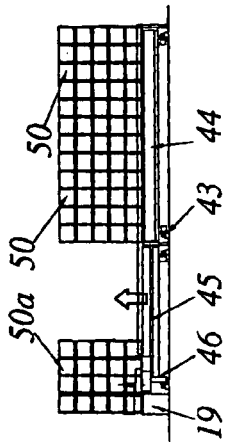
Fig 2H. Fig 2I. Fig 2J.
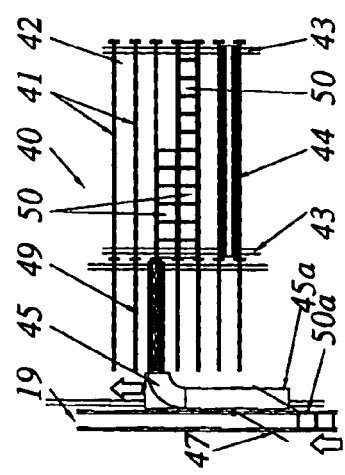
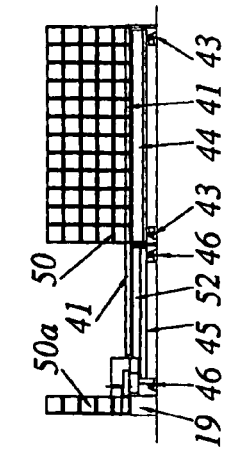

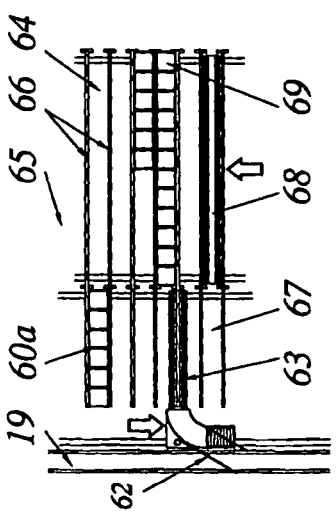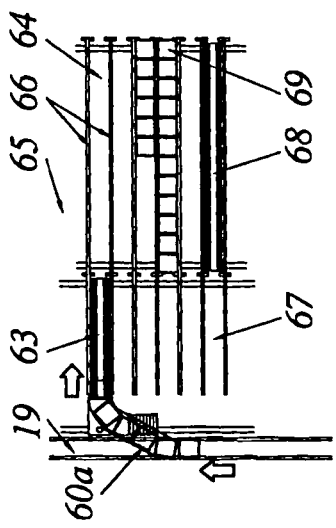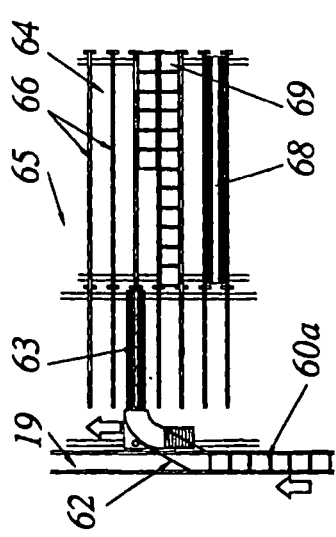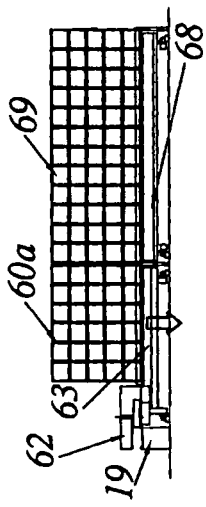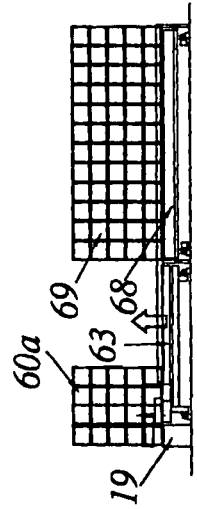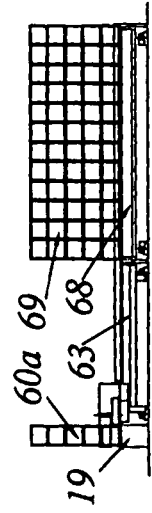

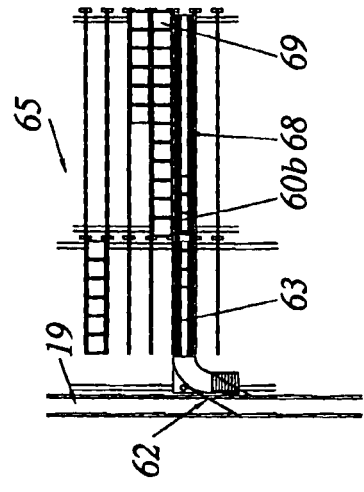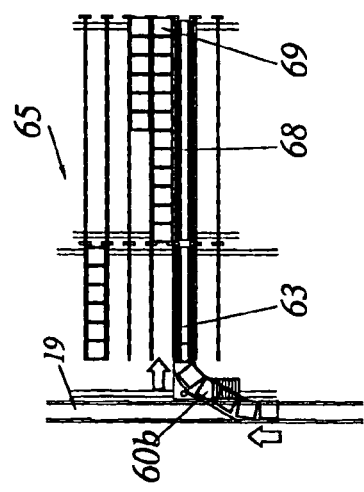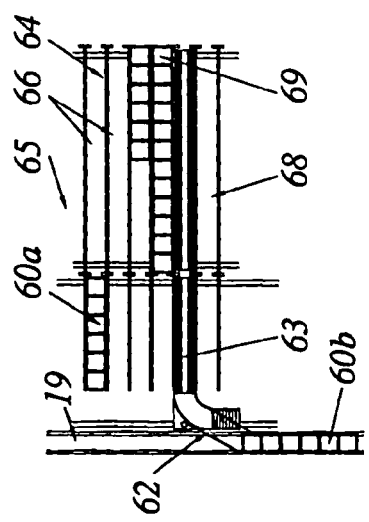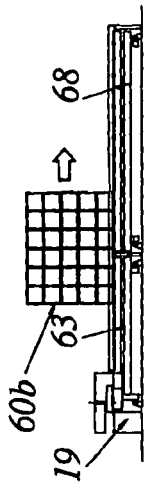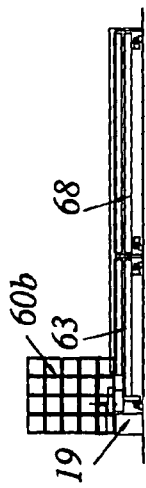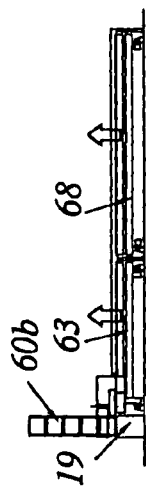

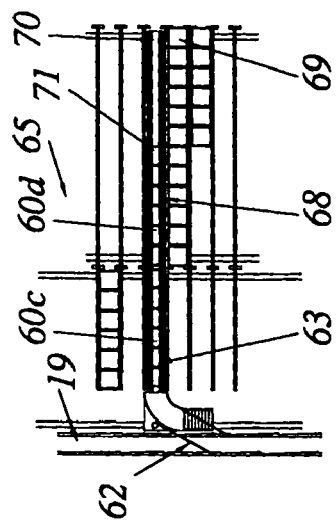
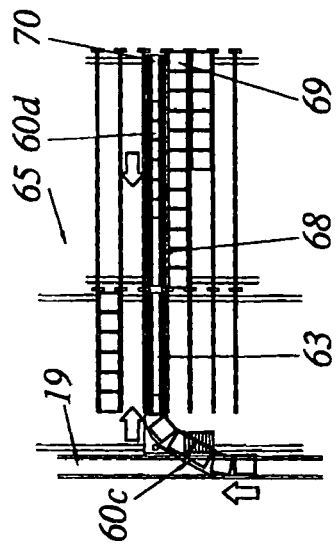
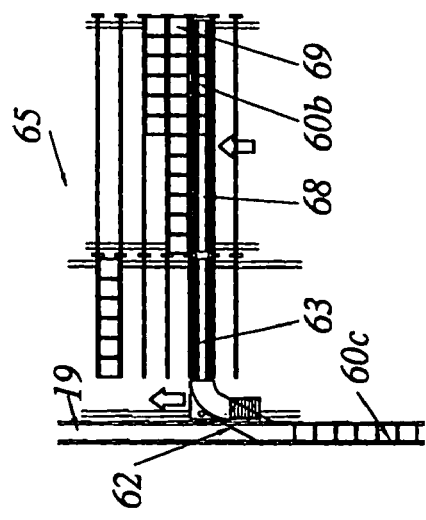
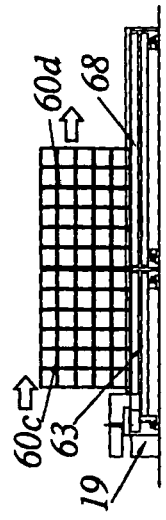
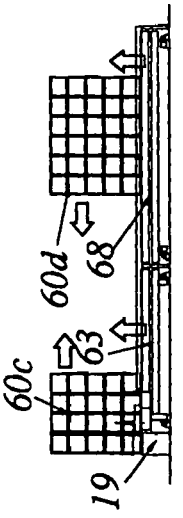
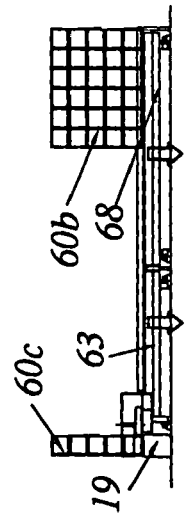

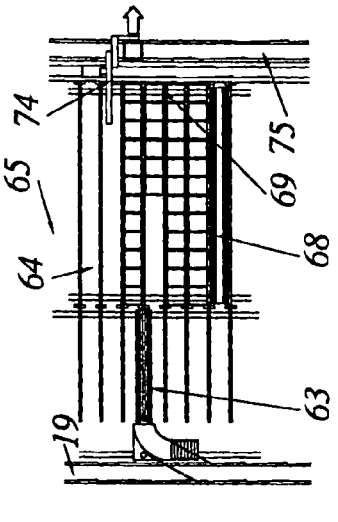
*Fig 5C.* *Fig 5B.* *Fig 5A.*
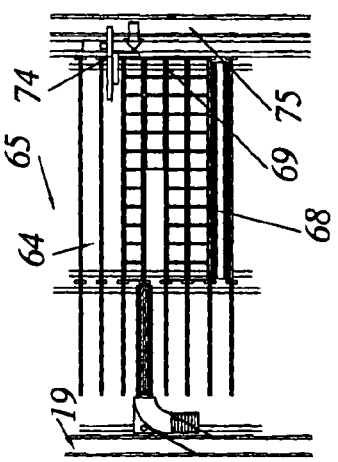
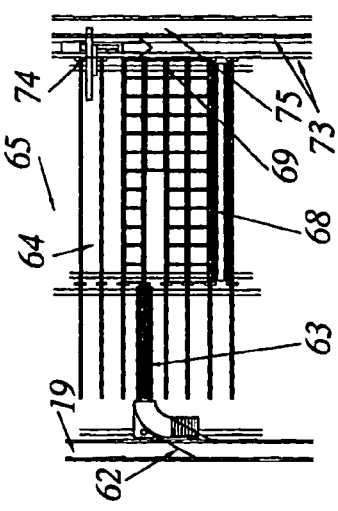
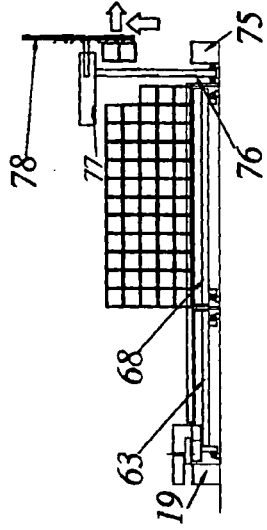
*Fig 5H.* *Fig 5G.* *Fig 5F.*
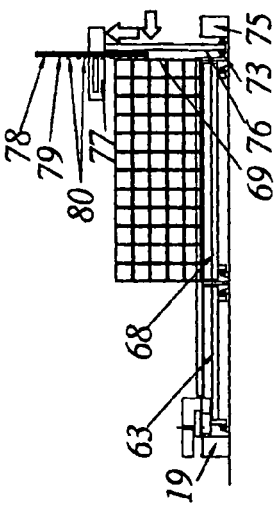
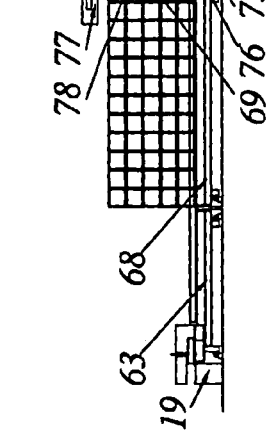

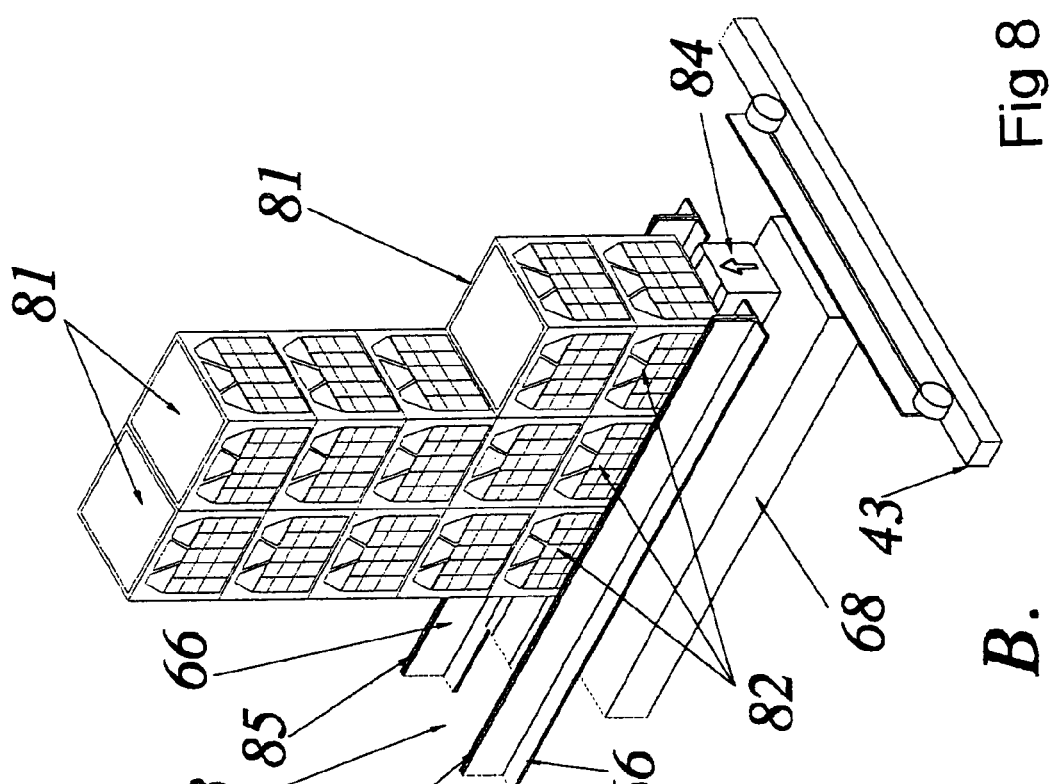
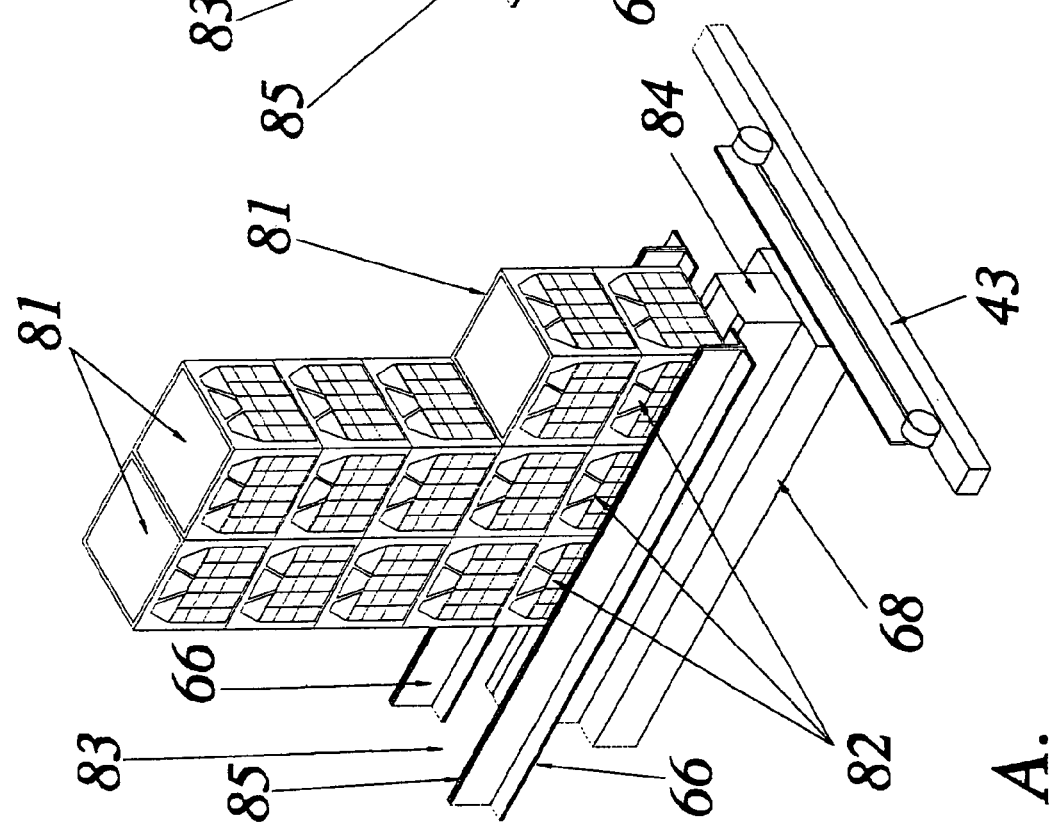
Fig 8

METHOD AND APPARATUS FOR CONTAINER STORAGE AND CONTAINER RETRIEVAL

This application is a Continuation of U.S. patent application Ser. No. 10/466,850 filed on Feb. 18, 2004, now abandoned.

TECHNICAL FIELD

This invention relates to a method and apparatus for storage in a warehouse environment of cases or other containers and to methods and apparatus for retrieval of containers.

Throughout this specification and claims, the word "container" has been used to refer to any suitable means for holding product and may include for example, crates, boxes, tins, cartons, cases, totes, bound together product or the like and also includes a plurality of grouped containers, such as a pallet of containers or a group of bound containers.

Furthermore, "pallet" has been used herein in reference to any platform or other means for supporting containers that is suitable for transporting a plurality of containers of product.

BACKGROUND

The term "order picking" has become associated with systems designed for receiving, storing and delivering product to and from some form of storage area. They may also use some form of warehouse management system for co-ordination of storage.

Products for distribution are often stored in a warehouse and retrieved therefrom for loading onto a vehicle for transport to customers. In an effort to increase the speed and efficiency of the storage and delivery system, apparatus for automated retrieval, or "picking", of product from the storage space have been developed. This has represented a large advance in the efficiency of order picking systems, which traditionally heavily relied on manual handling. Further advantages of automated systems include reduced overall cost, increased accuracy and decreased risk of personal injury.

An ongoing problem faced by warehouse managers is the efficient use of space within a warehouse. Each square metre of space within the warehouse has an associated cost and the warehouse management system must seek to obtain the maximum use of the space in the warehouse to be efficient and competitive.

Picking systems, whether manual or automatic, typically have a defined and fixed "pick face", or surface from which they can retrieve product. One problem presented to pick systems is how to replenish pick locations once they have been emptied. Traditionally, such replenishment is performed manually, with the assistance of a forklift or similar. This requires access to all parts of the storage area, the access channels, roads or similar requiring valuable space. Another problem faced by pick system designers is how to minimise the distance that the picking means, automated or manual has to travel to fulfil typical orders. The more the picking means has to travel, the longer the picking takes.

Due to demand variations, some products will invariably ship in greater quantities than others. Individual deliveries to customers may consist of relatively large quantities of a few products, but only a few, or even single cases or individual items of other products. This variability of product volumes presents a logistics problem in attempting to use the available resources, whether automated or manual or a combination most efficiently to obtain the best throughput.

Furthermore, the product stored in a warehouse may include a substantial variety of any given product. For example, a warehouse storage for milk will include crates containing cartons or bottles of different capacity, different flavour (e.g. conventional, chocolate, strawberry, banana, etc) and of different constituents or nutritional composition (e.g. full fat, trim, super-trim, skim, high calcium, etc). In addition, the product may be sorted by date of production. Thus, a warehouse may contain a large range of product over a wide area. Selection of the product to fill specific orders is, consequently, a complex process requiring: a) a sophisticated warehouse management system for the location of product delivered and stored, and for the selection of product for an order; and b) an efficient system for access to and removal of product from the storage area to fill an order.

Automated, robotic systems for order picking generally involve an x-y gantry system and a design for picking up individual containers or individual stacks of containers and transporting them from or to a conveyor. In the usual course, orders are delivered on pallets. Thus, the individually collected containers must then be formed into stacks of a required height, the stacks then formed into frames or partial frames of a required width and the frames or partial frames combined to form a pallet unit.

Such systems can be inefficient and/or impractical in a large warehouse environment where orders require product to be collated from many different parts of the warehouse. The robotic pickers have to cover large distances, back and forth, in the warehouse to complete a given order.

An existing automated storage and retrieval system is available from Automated Fork Truck Inc. of Salt Lake City, Utah, United States of America. This system is a storage and retrieval fork system that stores and retrieves product from vertically stacked racks. The system places product into and retrieves product from the racks through a vertical pick face at the end of a number of stacked racks and each rack being more than one pallet deep, with pallets being pushed away from the pick face for storage of another pallet in the same rack. With this system, the number of pick faces is limited and removal of individual containers from within pallets is not facilitated.

U.S. Pat. No. 6,061,607 discloses an order picking system for retrieving high volume and low volume product from two separate regions, but more specifically involves the location of product in vertical stacks in cells of totes. Low demand product is retrieved by a picker mechanism in a pick zone, by movement of that mechanism vertically above the pick zone and selection of individual articles from selected cells in selected totes. The system is primarily directed towards storage and retrieval of individual articles, which may be of high or low demand, rather than of containers containing a plurality of articles, which must, inevitably, be stored and transported in a different way.

U.S. Pat. No. 5,636,966 discloses a case picking system that removes full layers of cases and individual cases from storage towers. The storage towers are replenished from a further tower acting as a replenishment system. This requires double-handling of the transported layers. Moreover, the layers themselves are more demanding in their transport requirements than are individual cases or pallets.

It is an object of the present invention, to provide an automated means of storing and/or retrieving containers that efficiently uses the available footprint and or quickly stores and retrieves product, overcoming or alleviating problems with storage and retrieval systems at present, or at least to provide the public with a useful alternative.

Further objects of the invention may become apparent from the following description, given by way of example only.

SUMMARY OF THE INVENTION

According to one aspect of the present invention, there is provided apparatus for use in a storage and retrieval system for product held in containers, said apparatus including multiple, parallel spaced-apart support members defining a plurality of rows, each adapted to support a base of a plurality of containers thereby forming a container store, one or more conveying means engageable with one or more containers in a row to transport it or them longitudinally within that row, wherein said one or more conveying means is movable transverse to said rows below said rows to enable selective engagement with containers in said rows, one or more loading means movable transverse to said rows along an end of said rows to enable loading of one or more containers into a selected row, and a computer control system that in use automatically controls operation of the loading means and conveying means.

Preferably, the one or more loading means may include a transfer conveyor extending beneath at least a portion of said rows.

According to another aspect of the present invention, there is provided apparatus for use in a storage and retrieval system for product held in containers, said apparatus including multiple, parallel spaced-apart support members defining a plurality of rows, each adapted to support a base of a plurality of containers thereby forming a container store, one or more conveying means engageable with one or more containers in a row to transport it or them longitudinally within that row, one or more loading means movable transverse to said rows along an end of said rows to enable loading of one or more containers into a selected row, wherein the loading means includes a transfer conveyor extending beneath at least a portion of said rows and moveable transverse to said rows below said rows, and a computer control system that in use automatically controls operation of the loading means and conveying means.

Preferably, said one or more loading means may include a transfer conveyor extending beneath at least a portion of said rows, thereby providing said one or more conveying means for the portion that it extends beneath.

Preferably, the or each transfer conveyor may be substantially the length of a frame of containers, the frame including at least three stacks.

Preferably, the or each loading means may have a length sufficient to support at least one frame of containers including at least three stacks and transport said at least one frame of containers transverse to said rows along an end of said rows.

Preferably, the length of the or each conveying means may be substantially the length of at least two frames of containers, each frame including at least three stacks.

Preferably, said one or more loading means is separate from said one or more conveying means and the one or more conveying means may be moveable below and transverse to said rows independently of the one or more loading means.

Preferably, said one or more loading means and/or said one or more conveying means may each include an index conveyor locatable at a first and a second level, wherein at the first level, the index conveyor is located below said support members and at the second level, the index conveyor extends between said support members to contact said one or more containers to enable the index conveyor to convey it or them to a required location.

Preferably, the or each index conveyor may be divided into a plurality of longitudinal segments, each segment able to transport one or more stacks and/or partial stacks of containers in a defined longitudinal region in a row.

In a preferred form the support members may include parallel spaced-apart pairs of rails adapted to support opposite edges of a base of a plurality of containers.

In one preferred form the apparatus may further include picking means for removing a container, stack or partial stack of containers from a pick face defined by the containers closest to the ends of the plurality of rows of the container store, said picking means including a picker gripper adapted to engage with one or more containers in a stack and movable in x, y axes in the plane of a row, thereby enabling engagement of the picker gripper with one or more containers, displacement of those gripped containers away from the row and depositing of it/them at a selected location, wherein said picking means is engaged with transportation means to transport the picking means transversely along the pick face.

Preferably, the picker gripper may be further moveable parallel to said rows to enable selective engagement with containers not closest to the end of a row.

In another preferred form the apparatus may further include picking means for removing containers from a pick face defined by the upper surface of the container store, the picking means including one or more gantry systems, each adapted to relocate one or more containers from the container store to a required location, wherein once a space in said container store is created by the removal of containers, said conveying means is operable to move containers adjacent to said space into said space, thereby creating a loading space at an edge of the container store whereby a further container may be loaded into said loading space by said loading means.

Preferably, the container store may in use store a plurality of first containers each holding a plurality of second containers, wherein the picking means is further adapted to remove both selected second containers and selected empty first containers from said container store.

Preferably, the first containers may be pallets and the apparatus may further include a pallet conveying means for conveying pallets wherein at least one of said gantry systems is adapted to place said second containers onto pallets located on said pallet conveying means and transport pallets removed from the store by said picking means onto said pallet conveying means.

Preferably, the picking means may place containers removed from the container store onto a container conveying means and the apparatus may include a palletiser to receive containers and pallets from said container conveying means and said pallet conveying means respectively, wherein said one or more gantry systems in use load full layers of containers from the container store onto pallets on said pallet conveying means and relocate partial layers of containers from the container store onto said container conveying means for receipt by said palletiser and wherein the palletiser loads all or selected containers from said partial layers onto said pallets.

Preferably, the container storage and retrieval system may include a reordering system for reordering containers that have been relocated as a partial layer of containers into a required order for loading by said palletiser prior to reaching said palletiser.

Preferably, the container store may include a first and a second store area located on opposing longitudinal sides of said pallet conveying means, wherein in use the picking means removes only full layers from the first store area and any partial layers are taken from the second store area.

Preferably, said container store may store the first containers adjacent to each other in a grid pattern, wherein the container store extends at least three said first containers away from the peripheral edge of the container store.

Preferably, the space between containers in said grid pattern may be substantially minimised according to the minimum space required by said picking means.

According to another aspect of the present invention, there is provided a method of storage for product held in containers, said method including providing a container store having multiple, parallel spaced-apart support members defining a plurality of rows and each adapted to support a base of a plurality of containers, loading containers on said support members by moving a loading means carrying one or more containers transverse to said rows and along an end of said rows to align the loading means with a selected row and moving containers into the selected row from said loading means, moving one or more conveying means transverse to said rows below said rows for selective engagement with containers in said rows and conveying one or more containers longitudinally within a row as required to move containers to or from that row, and providing automated control of the operation of said loading means and conveying means by a computer control system.

Preferably, the loading means may include a transfer conveyor extending beneath at least a portion of said rows and the method includes using said transfer conveyor as said one or more conveying means for the portion that it extends beneath.

According to a further aspect of the present invention there is provided a storage and retrieval system including:

a first storage zone in which containers of product are storable in frames, each frame including a plurality of stacks of containers;

a second storage zone in which containers of product are storable in stacks, including apparatus to receive, locate and store frames and including a first automated retrieval system to retrieve stacks of containers;

a third storage zone in which containers of product are storable in stacks, including apparatus to receive, locate and store stacks and including a second automated retrieval system to retrieve as required individual containers, partial stacks and stacks of containers; and a conveying system in communication with each storage zone and including conveying means operable to deliver frames to the second storage zone, receive stacks retrieved from the second storage zone and deliver them to the low storage zone and to receive containers from each zone and deliver them to a collation zone at which product orders are collated.

Preferably, the bulk storage zone may be arranged to allow manual retrieval of frames of containers stored therein and the conveying system is suitable for receiving manually retrieved frames of containers.

Preferably, the storage and retrieval system may include a fourth storage zone arranged to allow manual retrieval of individual items of product from the containers.

Preferably, the storage and retrieval system may include a manager computer including an inventory system for recording the flow and location of product within a controlled area defined by at least the second and third storage zones.

In one preferred form the second and third storage zones may each include: a storage retrieval unit including multiple parallel spaced-apart support members, each defining a row and adapted to support a base of a plurality of containers, and one or more index conveyors parallel to and beneath the rows, movable transverse to the rows, and including engagement means enabling engagement of the or each index conveyor with one or more stacks and/or partial stacks of containers in a row to transport it or them longitudinally within that row.

Preferably, one or both of the second and third storage zones may further include at least one transfer conveyor, the or each transfer conveyor movable transverse to the rows, having a loading region parallel to the rows, and including engagement means enabling engagement with one or more stacks and/or partial stacks of containers in a row to transport it or them into or out of the storage zone.

Preferably, the manager computer may be operable to cause the container storage and retrieval system to replenish the third storage zone with one or more stacks of containers sources from the second storage zone.

According to a further aspect of the present invention there is provided a method of container storage and retrieval including:

in a first storage zone storing containers of product in frames, each frame including a plurality of stacks of containers;

in a second storage zone storing containers of product in rows of stacks, retrieving selected stacks of containers from the second storage zone using an automated retrieval system and replenishing containers by receiving frames;

in a third storage zone and retrieving selected individual containers, partial stacks or stacks of containers using a second automated retrieval system and replenishing containers by receiving stacks from the second storage zone; and collating containers retrieved from the storage zones into orders.

Preferably, the method may include manually retrieving frames of containers from the first storage zone.

Preferably, the method may include providing a fourth storage zone, manually retrieving individual items of product from the containers in the further low storage zone and collating containers retrieved from the further low storage zone into orders.

Preferably, the method may include using a conveying system to transfer containers between the second and third storage zones and to transfer containers from the first, second and third storage zones to a collation zone for collation into orders.

According to another aspect of the present invention, there is provided a storage and retrieval system substantially as herein described with reference to FIGS. 1 to 8 or FIG. 9 of the accompanying drawings.

According to another aspect of the present invention, there is provided a method of container storage and retrieval substantially as herein described with reference FIGS. 1 to 8 or FIG. 9 of the accompanying drawings.

Further aspects of the present invention, which should be considered in all its novel aspects, may become apparent from the following description, given by way of example only and with reference to the accompanying drawings.

BRIEF DESCRIPTION OF THE DRAWINGS

FIGS. 2A-2F: show plan schematic representations of transfer and index conveyors depositing product into the intermediate storage zone of the storage retrieval system of FIG. 1.

FIGS. 2H-2M: show side schematic representations of transfer and index conveyors depositing product into the intermediate storage zone of the storage retrieval system of FIG. 1.

FIGS. 4A-4J: show plan schematic representations of the delivery of product into the low-demand product zone of FIG. 1.

FIGS. 4K-4T: show side schematic representations of the delivery of product into the low-demand product zone of FIG. 1.

FIGS. 5A-5E: show plan schematic representations of the selection and removal of product from the low-demand product zone of FIG. 4.

FIGS. 5F-5J: show side schematic representations of the selection and removal of product from the low-demand product zone of FIG. 4.

FIG. 8: shows a perspective view of the operation of an index conveyor of the invention, in one preferred form.

DEFINITIONS

Figure 1:
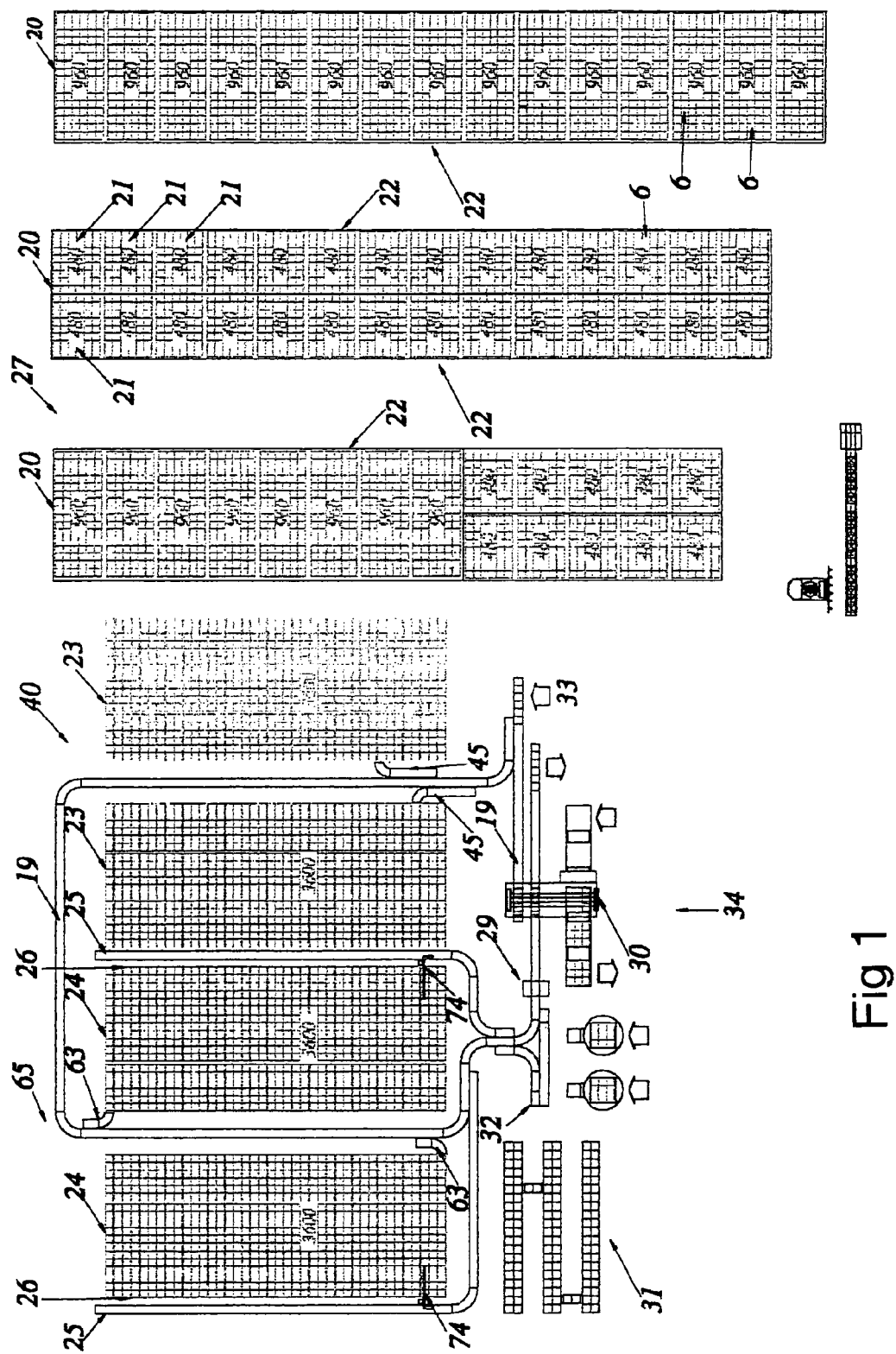
FIG. 1: shows a plan, schematic representation of a storage and retrieval system of the present invention in one preferred form.

"Manager computer"—refers to a control system which programs operation of the conveying means to, from and within each zone of a storage retrieval system of the present invention. A manager computer includes, without limitation, a warehouse management system, which maintains an inventory of products coming into and being removed from a controlled area, and the locations of product within the controlled area.

"Controlled area"—refers to the area of a warehouse or other storage and product management area under the control of the manager computer.

"Container"—refers to any unit for holding a product and includes, without limitation, crates, boxes, tins, cartons, cases, totes or a plurality of grouped containers, such as a pallet of containers or a group of bound containers.

"Stack"—refers to a set number of containers, one on top of the other.

"Partial stack"—refers to fewer than the set number of containers which form a complete stack.

"Frame"—refers to a set number of stacks, side by side in a row.

"Layer"—refers to a cross section of containers through a number of frames arranged side by side.

"Partial frame"—refers to fewer than the set number of stacks or partial stacks side by side in a row, or the set number of a combination of stacks and partial stacks side by side in a row.

"Main conveyor"—refers to a conveying mechanism which is in communication with each zone of the controlled area.

"Transfer conveyor"—refers to a conveying mechanism for transferring product from the main conveyor into and out of the intermediate storage zone, or into the low-demand product zone.

"Index conveyor"—refers to a conveying mechanism for conveying product within a given row of storage area.

DETAILED DESCRIPTION OF THE INVENTION

The present invention relates to methods and apparatus for use in a storage and retrieval system for containers. The storage and retrieval system includes one or more storage areas for storing containers and the apparatus and methods of the present invention are particularly directed to the transfer of containers to and from the storage areas.

Two separate embodiments are described herein below. The first may be preferred for discrete containers and the second preferred for containers located on pallets or other means for supporting a plurality of containers. However, a pallet may be treated as a container in itself. Therefore, where in the following description reference is made to an individual container a reference to a pallet or suchlike is also incorporated where appropriate.

The present invention may have application to the management, in a storage and retrieval area, of product that is available in a plurality of varieties, milk being a good example. With such products, any given order generally includes a large volume of a small number of varieties, an intermediate volume of some varieties and a small volume of, possibly, a reasonably large number of varieties. This creates problems for efficient storage and retrieval. The present invention provides a controlled area within a warehouse where each type of product (high, intermediate and low demand) can be stored efficiently (i.e. with minimum waste of space), and yet always be readily accessible for inclusion in a given order.

Figure 7:
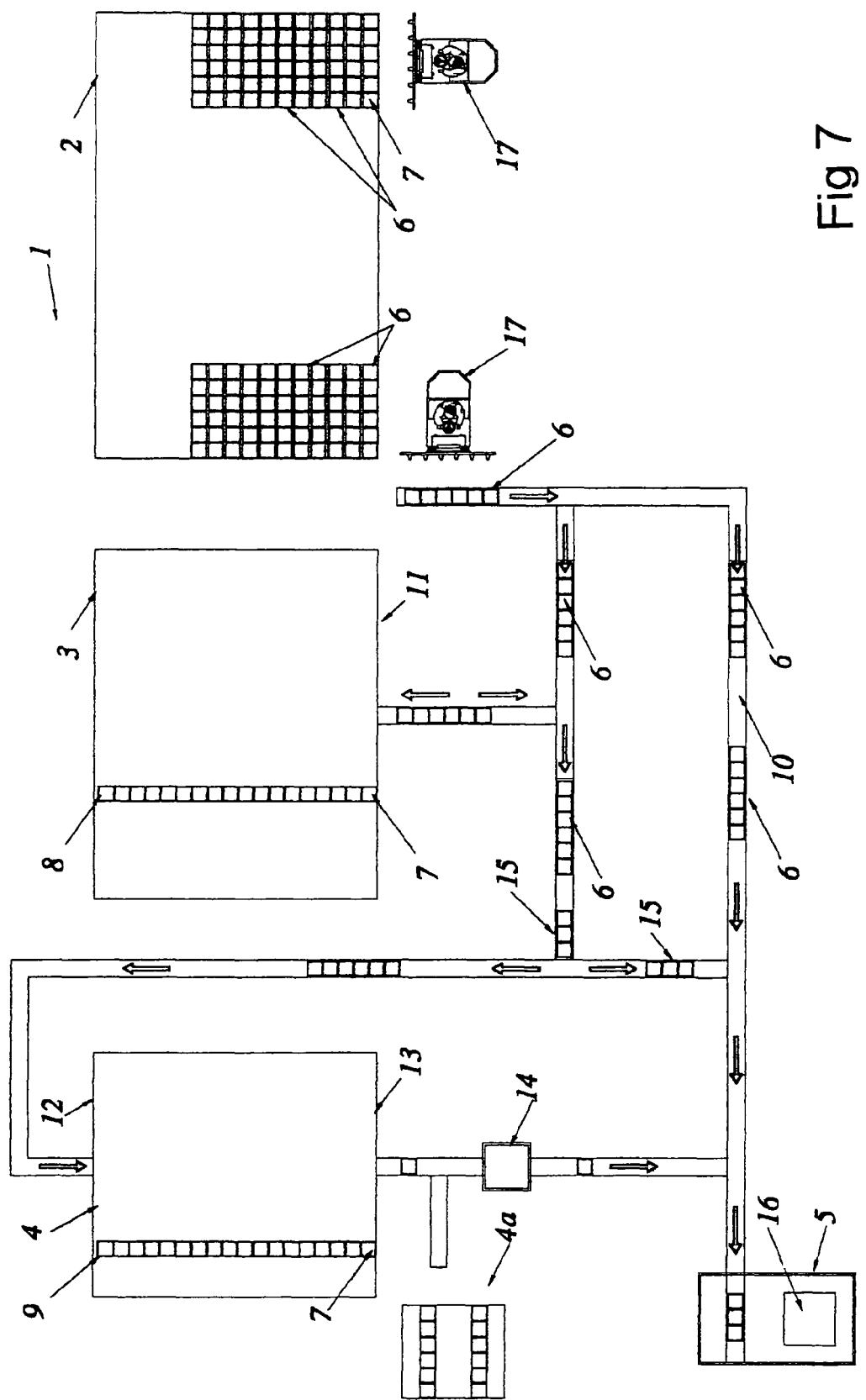
FIG. 7: shows a schematic representation of a controlled area of a storage and retrieval system of the present invention in one preferred form.

Referring to FIG. 7, an overview of a controlled area 1 of a storage retrieval system of the invention, in the form of a schematic representation is shown. Within the controlled area 1 is a bulk storage zone 2, an intermediate storage zone 3, low-demand product zone 4 and an order accumulation or collation zone 5. Within the bulk storage zone 2 product is stored in frames 6 of containers, each frame 6 including a plurality of stacks 7. In the intermediate zone 3 product is stored in a plurality of rows 8 (only one shown) of individual stacks 7 of containers. In the low-demand product zone 4, product is similarly stored in a plurality of rows 9 (only one shown) of individual stacks 7 of containers. The main conveyor 10 forms a system of conveyors for conveying product through the controlled area 1, including to and/or from each zone. In the embodiment shown in FIG. 7 product is delivered to and withdrawn from the intermediate zone 3 from the same end 11 of that zone, although it will be appreciated that in an alternative embodiment product could enter from one side and exit at the opposite side.

In the low-demand product zone 4 product is received at one side 12 and exits from a picking face 13 on the opposite side. Products selected from the picking face 13 may be single containers, partial stacks or full stacks. They may be formed into stacks at the pick face by the output picker from single containers or partial stacks. Alternatively, containers may be formed into full stacks by being conveyed through a stacker 14.

There will also be occasions where individual containers holding a variety of different products are required. These are referred to as "tails". A further low demand product zone may accommodate for the supply of tails. Herein, a further low demand product zone is referred to as a tails zone. FIG. 7 shows a tails zone generally referenced by arrow 4a.

The tails zone 4a may be manually operated, as automation may not result in significant cost savings or efficiency increases. It is believed that the combination of four product zones in the form of a manually operated bulk storage zone 2, an automated intermediate storage zone 3, an automated low-demand product zone 4 and a manual tails zone 4a gives an effective balance of manual and automated warehouse management. Automation in bulk storage zones typically involves using a gantry system to pick stacks of containers, requiring multiple trips between the store and the drop location. However, using a manual system with appropriate forklifts whole frames of product can be picked as shown in FIG. 7. Thus, a manual pick system for bulk product may be more cost-effective and time efficient than an automated system. For the tails region, an automated system to pick individual items may be unreliable as product may move about a container once it becomes close to empty. Also, individual items can vary physically to such a degree that it is difficult and expensive to design a mechanical system to handle them all.

An accumulation zone 5, receives product via the main conveyor 10 to form a given order. The order may include one or more full frames 6 from the bulk storage zone 2, a stack or plurality of stacks 15 forming less than a frame or full frame (of a low or intermediate demand product) from the intermediate storage zone 3 and stacks or partial stacks of containers received from the low-demand product zone 4 via the stacker 14. The accumulation zone 5 may include a palletiser 16.

Within the bulk storage zone 2, and between this zone and the main conveyor 10, frames of product may be manipulated by forklift vehicles 17.

First Embodiment

A first embodiment of a storage and retrieval system according to the present invention will now be described by way of example with reference to a substantially complete warehouse management system. The storage and retrieval system may include a plurality of storage areas and associated conveyors. Product may be allocated to a storage area depending on the typical volumes of product transfer. Picking means is provided to retrieve product from the stores and conveyors may be utilised to move containers within a store.

FIG. 1 represents a controlled area 100 in a more detailed and specific preferred embodiment. In this embodiment a bulk storage zone 27 includes rows 20 of product. Each row includes units 21 each containing a plurality of frames 6 of containers. Each unit 21 is one frame wide, one frame high and a predetermined number of frames deep. Each row 20 may be more than one unit high. In a preferred form each row 20 may have two levels of units one above the other. Each unit 21 has one or more access faces 22 via which frames 6 can be inserted into or removed from the unit by, for example, forklift vehicles 17. Thus, in this bulk storage zone 27 there is high density storage of high volume product.

In the embodiment of FIG. 1 an intermediate storage zone 40 and a low-demand product zone 65 are each shown to include two banks 23, 24 respectively of product. A primary or main conveyor 19 passes between the banks 23 of the intermediate zone 40 and the banks 24 of the low-demand product zone 65. In addition, the main conveyor 19 has branches 25 that extend along the outer pick faces 26 of the low-demand product banks 24.

Transfer conveyors 45 and 63 engage with the main conveyor 19 in the region of the product banks 23, 24 respectively. These transfer conveyors 45, 63 are movable along the main conveyor 19 to align with selected rows of product in the banks 23, 24.

Associated with each branch 25 of the main conveyor 19, adjacent the pick faces 26 of banks 24 of the low-demand product zone 65, are output pickers 74, described in greater detail herein below. Containers, partial stacks of containers or stacks of containers on the main conveyor 19 exiting the low-demand product zone 65 may pass through a stacker 29 before entering the accumulation zone 34, which includes a palletiser 30. A full frame 33 of product from the bulk storage zone 27 may be loaded on the main conveyor 19 to pass into the intermediate storage zone 40 or directly to the accumulation zone 34. Stacks of containers may transfer from the intermediate storage zone 40 for transfer into the low-demand product zone 65 or through that zone directly to the accumulation zone 34. Single containers, partial stacks or full stacks of containers may be selected from the pick faces 26 and transferred by the main conveyor 19 to the accumulation zone 34.

A manual tails zone 31 is provided for transfer of tails to the main conveyor 19 at region 32, as required to make up an order.

Reference is now made to operation of the mechanisms for conveying product within the intermediate 40 and low-demand 65 product zones, with particular reference to FIGS. 2A-FIG. 4T. Reference to "FIG. 2" is to be read as referring collectively to FIGS. 2A-2M. Similarly, reference to "FIG. 3" is a reference to FIGS. 3A-3J, reference to "FIG. 4" is a reference to FIGS. 4A-4T, and reference to FIG. 5 is to be read as referring to each of FIGS. 5A-5J.

With reference to FIG. 2, the intermediate storage zone 40 (or a part of it) is shown with a plurality of parallel, adjacent pairs of support rails 41, each forming a row 42 within the intermediate storage zone 40. Each pair of support rails 41 is adapted to support the base of a container by opposite opposing edges so that the main region of a base of a container is accessible from beneath. It will be appreciated that an alternative arrangement could involve containers supported in each row by a single central support member, with engagement from beneath, by an engagement portion of the conveyor, by opposite edges of the containers.

Beneath the support rails 41 are transport rails 43 on which is supported an index conveyor 44. This index conveyor 44 is parallel to the rows 42 and transportable beneath those rows. It includes means for engaging with the base of one or more containers at the bottom of a stack or stacks positioned within a row 42, and transporting that stack or stacks along that row in either direction.

Whilst the embodiment shown in FIG. 2 presents the index conveyor 44 as a single long unit, it could alternatively be in a number of separate segments, each segment extending beneath a given portion of the length of a row 42. With such a segmented index conveyor different stacks of containers could be moved in different regions of the intermediate storage zone, in different rows, at the same time. In addition, there may be more than one index conveyor 44 operating beneath the rows 42.

With reference to FIGS. 2A and 2H, a transfer conveyor 45 is supported on a separate set of rails 46. The transfer conveyor 45 includes guide members 47, movable between a first position in which they guide containers from the main conveyor 19 onto the transfer conveyor 45, and a second position in which they are clear of the main conveyor 19 to allow containers to pass unhindered along the main conveyor 19. The transfer conveyor 45 also includes an extension 52 which extends beneath a loading region 49 of the pairs of rails. In the preferred embodiment shown in FIG. 2, this loading region 49 may be substantially the length of a frame 50 of containers, enabling a full frame 50 to be transported into the intermediate zone 40 and deposited in a row 42 without the index conveyor 44 and transfer conveyor 45 being aligned. Those skilled in the relevant arts will appreciate that the transfer conveyor may alternatively transfer containers directly into a selected row without the use of extension 52.

The sequence of events shown in FIG. 2 is as follows. In FIGS. 2A and 2H a frame 50a is being transported along the main conveyor 19 towards the guide members 47 of the transfer conveyor 45. FIGS. 2B and 2I shows that the engagement mechanism of the transfer conveyor 45 is raised to receive and transport the frame 50a from the main conveyor 19 onto the loading region 49 of the transfer conveyor 45. Once the full frame 50*a* is supported above a row 42 the transfer conveyor 45 engagement mechanism is lowered to deposit the frame of containers on the support rails 41. The transfer conveyor 45 then moves away from that row (see FIGS. 2C and 2J).

Figure 2F:
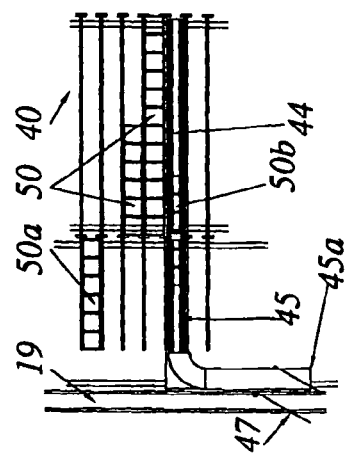
Figure 2E:
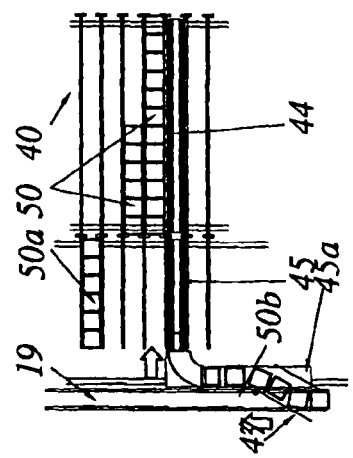
Figure 2D:
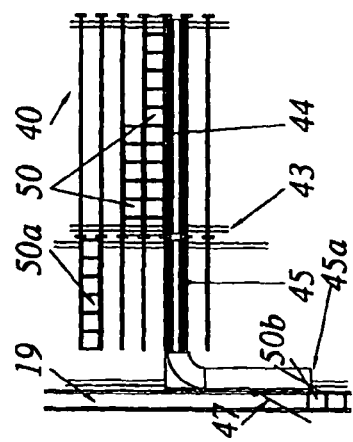
Figure 2M:
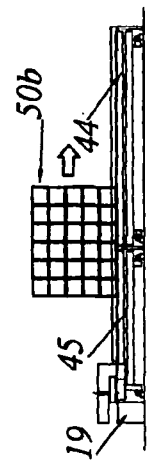
Figure 2L:
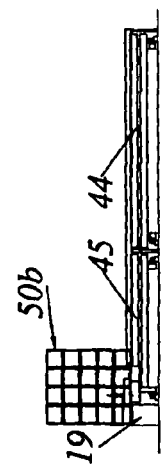
Figure 2K:
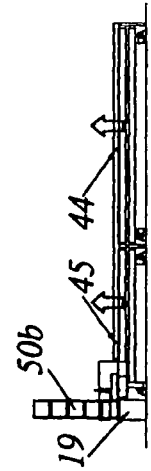
Figure 3A:
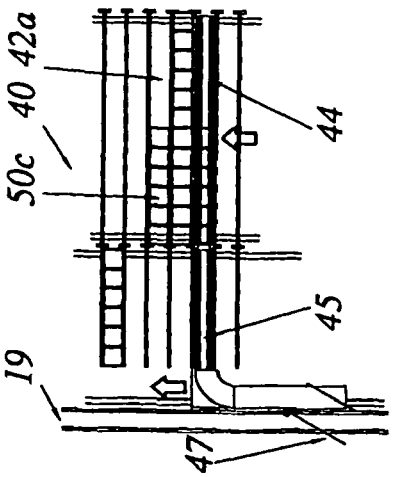
FIGS. 3A-3E: show plan schematic representations of the retrieval of product from the intermediate storage zone of FIG. 2.
Figure 3B:
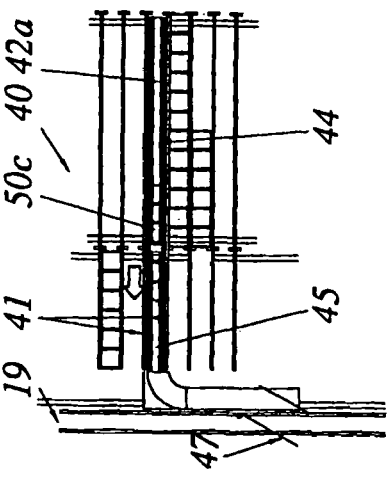
Figure 3C:
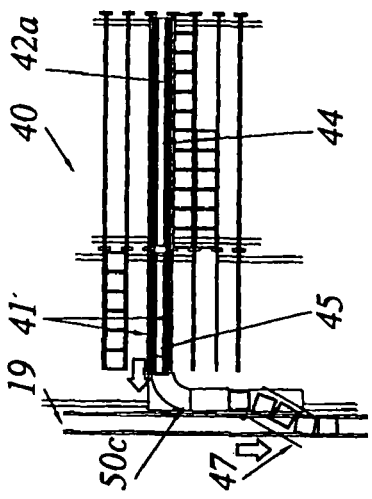
Figure 3F:
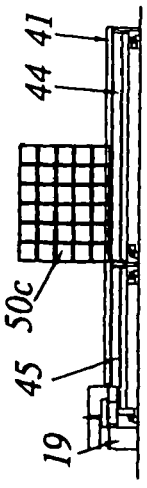
FIGS. 3F-3J: show side schematic representations of the retrieval of product from the intermediate storage zone of FIG. 2.
Figure 3G:
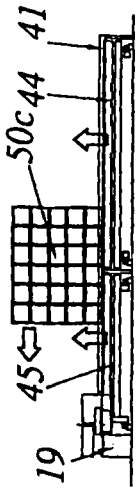
Figure 3H:
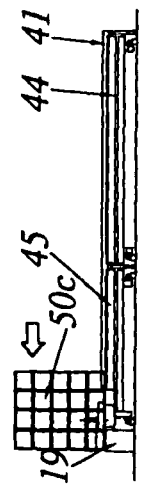
Figure 3D:
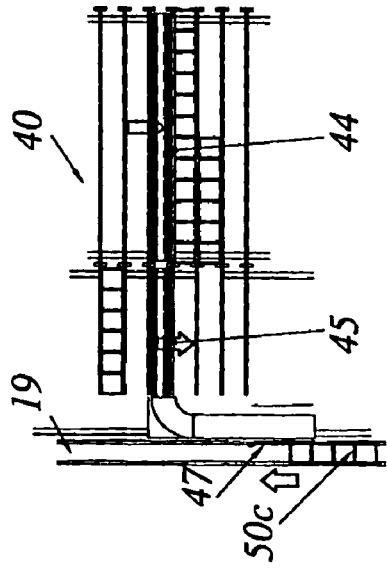
Figure 3E:
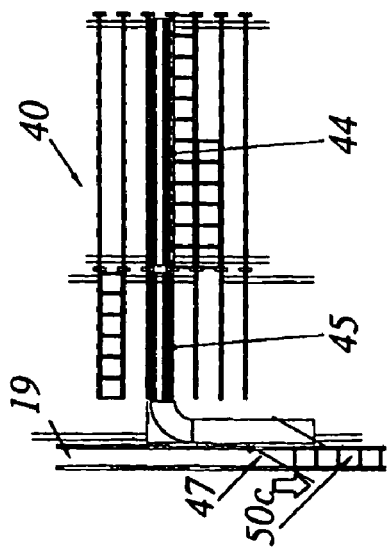
Figure 3I:
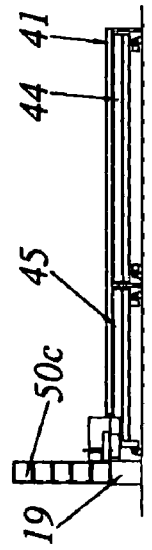
Figure 3J:
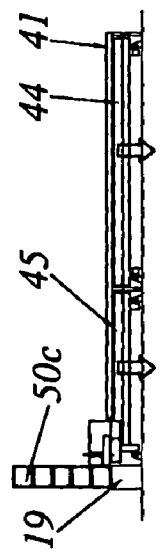
Figure 4J:
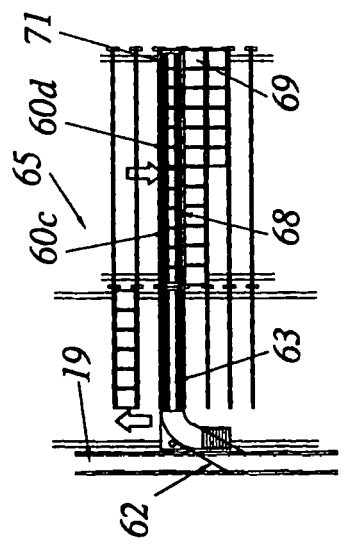
Figure 4T:
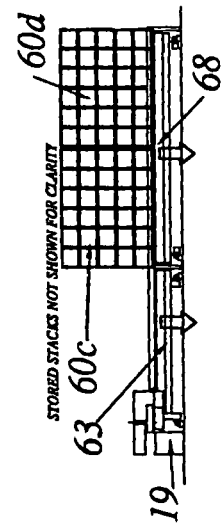
Figure 5E:
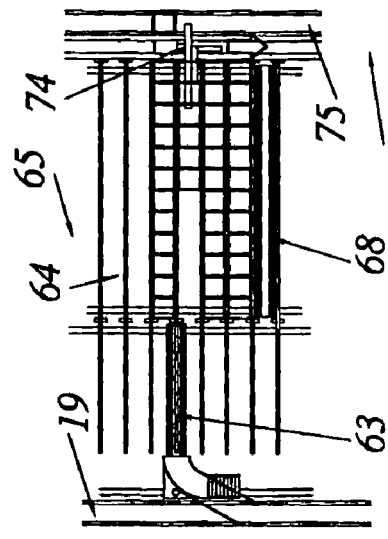
Figure 5J:
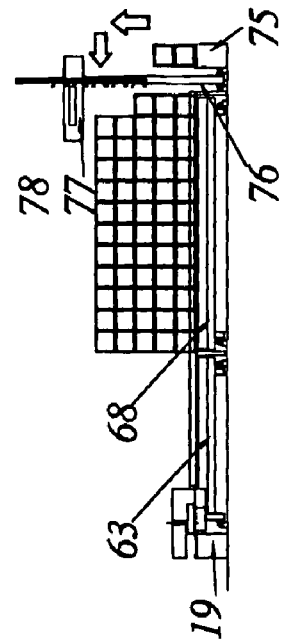
Figure 5D:
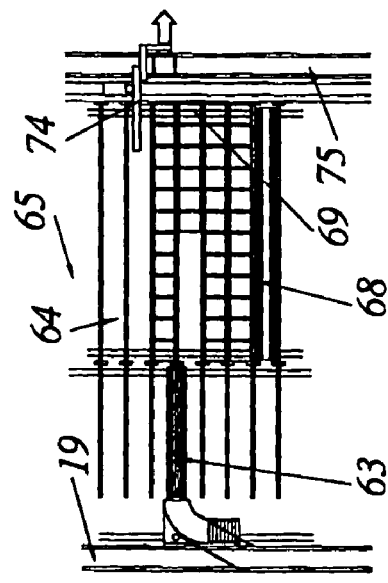
Figure 5I:
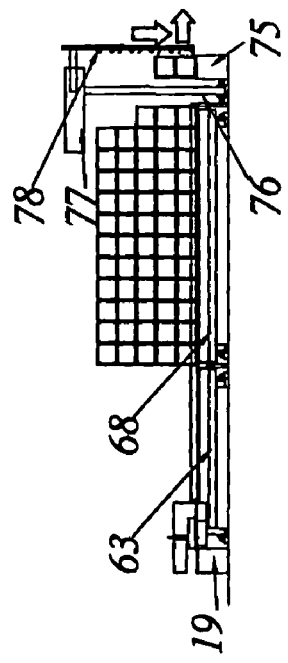

In FIGS. 2D and 2K the transfer conveyor 45 and index conveyor 44 are shown aligned, and the guide members 47 of the transfer conveyor 45 are positioned to receive a second frame 50*b* into the intermediate storage zone 40. Both the transfer conveyor 45 and the index conveyor 44 have their engagement mechanisms raised so that the frame 50*b* is transported along the full length of a row of the intermediate storage zone 40, to be deposited at the end of that row (see FIGS. 2E, 2L, 2F and 2M).

In an alternative embodiment, the transfer conveyor may extend along the line of the main conveyor 19 as indicated by extended region 45*a* in FIG. 2F. Stacks of containers or one or more frames of containers may be located on extended region 45*a* and transported to the required row. As the transfer conveyor may be constructed to allow faster movement than the main conveyor 19, the transfer conveyor could receive containers from the main conveyor 19, transport them to a required row and return to the conveyor 19 for another load. Such operation may allow closer spacing between frames on the main conveyor 19 and/or a higher travel speed for the main conveyor 19. Using a transfer conveyor with extended region 45*a* allows for a single loading point off the main conveyor 19 if required. This may reduce cost, as the main conveyor is typically more complex in the region where loading onto a transfer conveyor occurs.

FIG. 3 shows the operation of the conveying mechanisms within the intermediate storage zone 40 for removal of product from this zone. In FIGS. 3A and 3F the transfer conveyor 45 and index conveyor 44 are each moved to a selected row 42*a*. The engagement mechanisms are then raised to engage the base of containers of a frame 50*c* (see FIGS. 3B and 3G), and raise the frame 50*c* above its rails 41 for transportation out of the intermediate storage zone 40. As the frame 50*c* reaches the exit from the transfer conveyor 45, the main conveyor 19 must be reversed to complete withdrawal of the frame from the intermediate storage zone 40 (see FIGS. 3C and 3H). Once the frame 50*c* is clear of the transfer conveyor 45, the guide members 47 are moved clear of the main conveyor 19 and the engagement mechanisms of the transfer conveyor 45 and index conveyor 44 are lowered (FIGS. 3D and 3I). The main conveyor 19 can then be reversed again to transfer the frame 50*c* out of the intermediate loading zone 40, and at the same time the transfer conveyor 45 and index conveyor 44 are free to move to another row (FIGS. 3E and 3J).

The removal of product from the intermediate storage zone 40 by the above operation has the benefit of reversing the position of stacks of containers, i.e. stacks of containers at the end of the intermediate storage zone 40 furthest from the main conveyor 19, which may have been loaded into the zone earlier, will be the first stacks to exit the intermediate storage zone on the main conveyor 19. In an alternative, but less preferred embodiment, the index conveyor may be fixed in a row, with each row having its own index conveyor. This embodiment may however be more expensive to manufacture.

A further benefit of exiting product from the intermediate storage zone 40 by reversing the main conveyor 19 is that it allows multiple varieties of product to be accessible from a single row within the intermediate storage zone 40. A manager computer controlling location of product within the controlled area can access a given variety of product within a row of the intermediate storage zone 40, between other varieties in that same row. The transfer conveyor 45 and index conveyor 44 are aligned in that row, the stacks of product within that row are engaged by the conveyors; all stacks are transported towards the main conveyor 19, with the main conveyor in reverse, until the required stacks are on the main conveyor 19; the transfer conveyor 45 is reversed to retract any remaining stacks away from the main conveyor 19, the guide members 47 are shifted away from the main conveyor 19; the main conveyor 19 is indexed forward until the required stacks have passed the guide members 47; the guide members 47 are reintroduced across the main conveyor 19 and the main conveyor 19 is progressed so that the selected stacks exit the intermediate storage zone 40, whilst the remaining stacks return to the intermediate storage zone 40. If required, the stacks returned to the selected row of the intermediate storage zone 40 may be consolidated by retaining a first group of stacks on the index conveyor 44 at the end adjacent the transfer conveyor 45, operating the transfer conveyor 45 until stacks on that conveyor abut those on the index conveyor 44 and then progressing both conveyors simultaneously to transfer the consolidated group of stacks onto the index conveyor 44.

The low-demand product zone 65 has essentially the same configuration as the intermediate storage zone 40 in respect of incoming product in the storage area, as shown in FIG. 4, but it differs in respect of the discharge end, and the method of discharging product, as shown in FIG. 5.

Figure 6:
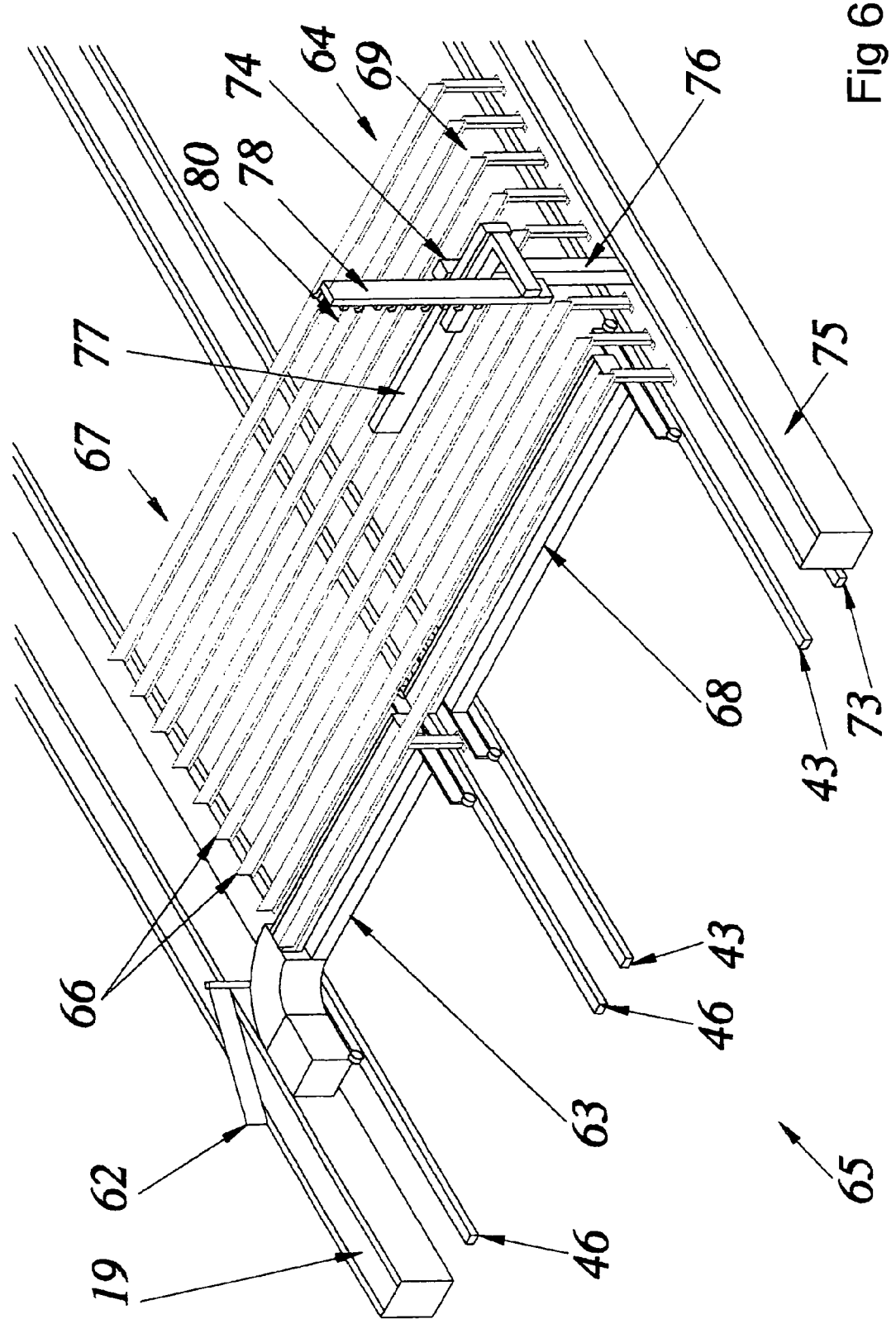
FIG. 6: shows an isometric view of a storage/retrieval unit of the invention, in one preferred form.

Details of the transfer and index conveyors 45, 44 of the storage/retrieval units which form the intermediate and low-demand zones 40, 65, and an output picker, are also shown in FIG. 6.

With reference to FIGS. 4 and 6, an incoming frame 60*a* (which could also be one or more stacks of containers from the intermediate storage zone 40) is transported along the main conveyor 19 until it reaches the guide members 62 of a transfer conveyor 63, positioned to direct product into a selected row 64 of the low-demand product zone 65. The frame 60*a* may be deposited on support rails 66 in the loading region 67 of a row 42 (as shown in FIGS. 4C and 4M), or alternatively (as shown in the sequence of FIGS. 4D-4G and 4N-4Q) may be transported the full length of the transfer 63 and index 68 conveyors to a pick face 69 end of the low-demand product zone 65.

FIGS. 4H-4J and 4R-4T show how the transfer conveyor 63 and the index conveyor 68 can be used to consolidate stacks of containers 60*c*, 60*d* in a given row 70. Thus, in FIGS. 4H and 4R, the transfer conveyor 63 is shown engaged with stacks of containers 60*c* to move them into the low-demand product zone 65, towards the index conveyor 68, whilst the index conveyor 68 is moving stacks of containers 60*d* in the opposite direction towards the transfer conveyor 63. When the two sets of stacks of containers 60*c*, 60*d* meet, the index conveyor 68 is reversed and all stacks move together along the row 70 until the end stack 71 is on the pick face 69.

For convenience, the representations in FIG. 4 do not show product in all rows, but in practice the purpose would be to have the pick face 69 with product in substantially all rows. Each row may represent a different product variety, although this does not exclude the possibility of having multiple varieties in a single row or multiple rows of the same variety. In any event, the computer manager tracks the location of all product within the controlled area and therefore knows the variety of product accessible at the pick face 69 at any given time.

FIG. 5 (and with reference to FIG. 6) focuses on the output end of the low-demand product zone 65. At the pick face 69 end of the low-demand product zone 65 is a rail system 73 on which is engaged one or more output picker 74. The rails 73 run transverse to the rows 64 in the low-demand product zone, and between the pick face 69 and an output conveyor 75 (which forms part of the main conveyor). The output picker 74 includes a vertical support member 76 mounted on a bogey, trolley or the like on the rails 73. A horizontal support member 77 is affixed to the top of the vertical support member 76, parallel to the rows, above the height of a full frame, and extending at least partially over the output conveyor 75 and above the rows 64 to enable a gripper 78 to engage a container at the pick face 69 or at least one container back from the pick face 69. The gripper 78 is movable in two orientations in respect of the horizontal support member 77: vertically up and down, and laterally towards and away from the pick face 69. A front face 79 of the gripper 78 includes a plurality of gripping members 80 adapted to enable the gripping and support of one or more containers, or a whole stack, on the gripper 78.

Thus, the output picker 74, on its rail system 73, can access any container on the pick face 69, or at least one container back from the pick face if there is no container in front of it on the pick face. The output picker 74 may therefore engage with one or more containers in a stack, or a full stack, and transfer that container or containers to the output conveyor 75. Alternatively, it may engage with a number of containers from one stack at the pick face and transfer them on top of another partial stack or to an empty slot of the pick face.

Enabling the output picker 74 to engage containers at least one stack back from the face 69 provides greater flexibility in the system, since the index conveyor 68 need not be indexing stacks along a row every time the end stack is depleted. To provide even greater flexibility, the output picker may be modified to allow selective engagement with containers that are not closest to the end of a row. This may be particularly useful for low volume product, as different stacks within a row may contain different product.

FIG. 8 shows, more clearly, the operation of an engagement mechanism associated with the transfer and index conveyors. FIG. 8A shows stacks of crates 80 and a partial stack 81 supported by opposite edges of containers 82 on support rails 66. The partial stack 81 is at the pick face 69 of the low-demand product zone. The index conveyor 68 on its rails 43 is positioned beneath this row 83.

The engagement mechanism 84 of the index conveyor 68 is lowered in FIG. 8A. In FIG. 8B the engagement mechanism 84 is raised, between the rails 66, to engage with the base of the containers 68 and raise the stacks 80 and partial stacks 81 clear of the supporting rails 66 but with lower parts of the containers 82 still between vertical portions 85 of these rails, acting as guides.

Thus, the system of the index and transfer conveyors, operating in the intermediate storage and low-demand product zones provides for automated storage and retrieval of low and intermediate demand product in an efficient and space-conserving manner. These conveyor mechanisms, together with the output picker, at the low-demand product zone output, also enable ready access to any given variety of product at any time.

Second Embodiment

A second embodiment of a storage and retrieval system according to the present invention will now be described by way of example. The second embodiment may be preferred for product stored on pallets.

Figure 9:
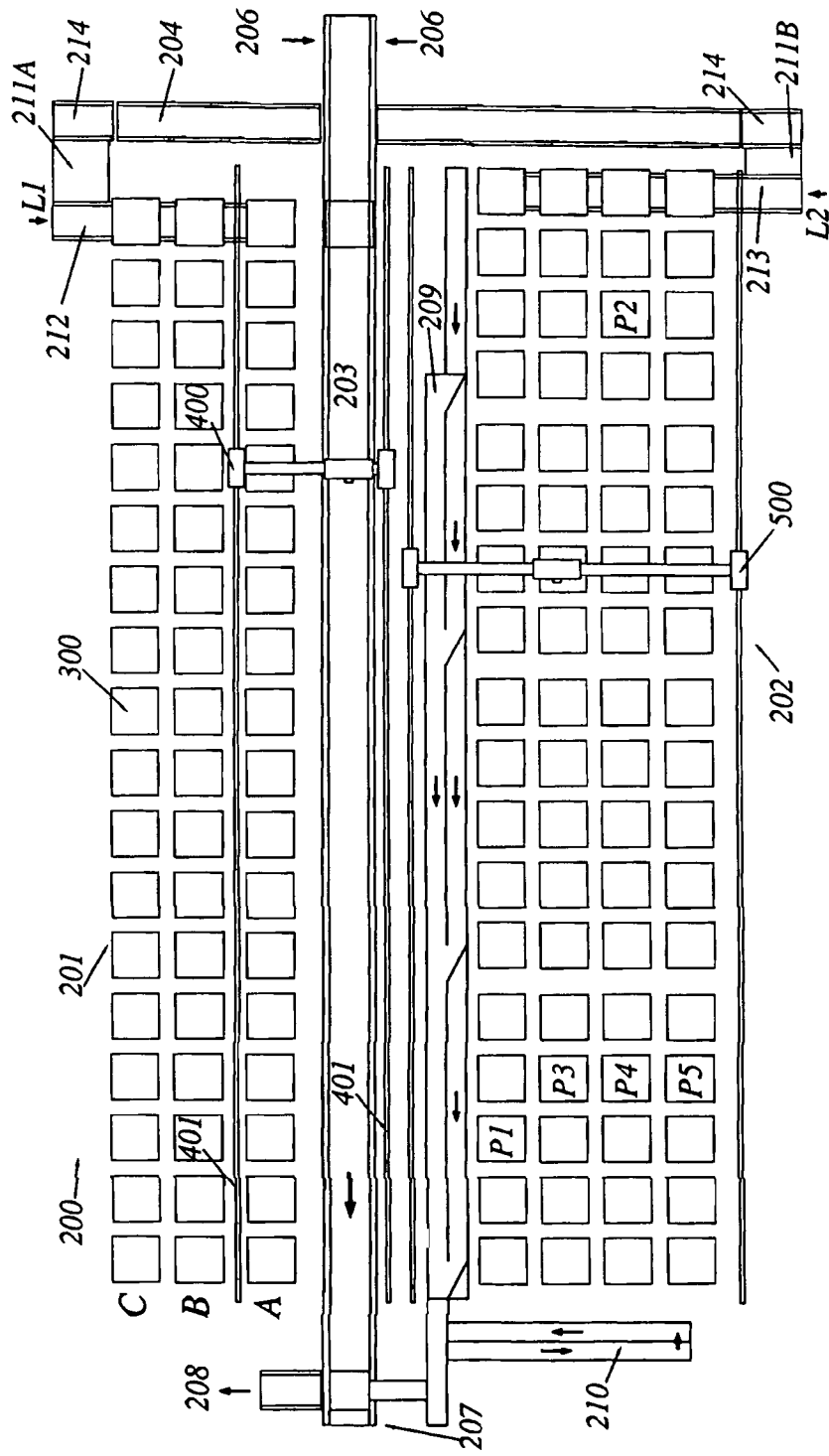
FIG. 9: shows a plan view of a second storage and retrieval system according to another embodiment of the present invention.

FIG. 9 shows a plan schematic view of a storage and retrieval system 200 according to this second embodiment. Containers are removed from the pallets by a gantry system, which is also used to remove empty pallets from the storage area. Once a pallet has been removed, adjacent pallets are moved into the space created by the removed pallet to create a space at a peripheral edge of the storage area. A full or partially full pallet may then be loaded into the storage area by locating it in the space at the periphery of the storage area.

The storage and retrieval system 200 may include a conveying system for conveying pallets and containers. Full layers of containers may be loaded onto the pallets and partial layers may be loaded onto the conveying means for loading onto the pallets by a palletiser after the full layers have been loaded. To enable optimisation of the retrieval of partial layers, which may require partial layers of containers to be retrieved out of order, a reordering system may be provided to reorder the partial layers into a required order prior to loading onto pallets by the palletiser.

The storage and retrieval system includes a first container store 201 and second container store 202. The containers are stored on pallets, one of which is referenced 300, which may be arranged in grid pattern. Each store 201, 202 may have a single layer or a stack of pallets.

The storage and retrieval system 200 includes a first conveying system including conveyor 203 for conveying pallets along the extent of the first container store 201. In the embodiment shown in FIG. 9, three rows of pallets are provided A-C. A full layer loading system 400, movable along rails 401 is provided to load full layers of product from the first container store 201 onto pallets located on conveyor 203. A gantry system may be used to provide the full layer loading from any of the pallets in the first container store 1. A suitable gantry system for full layer crate picking is available from Cascade Corporation of Portland, Oreg., United States of America. However, the loading system 400 may alternatively load full layers onto pallets only from the front row A, as shown in FIG. 9. This reduces the complexity of the required loading system and also reduces the travelling time loading system. However, if more combinations of product loading are required, product may have to be loaded from rows B and C.

The full layer loading system 400 may use any appropriate means to relocate a full layer of containers from the container store 201 onto pallets on conveyor 203. This may differ depending on the characteristics of the individual containers. For example, a clamping system may be used to provide frictional engagement across the layer. Suction may be used if the top face of the container is suitable. Alternatively, or in combination, the loading system may slide in below the layer of containers to support the layer during movement. Other methods of transporting full layers may be used and multiple layers may also be accommodated if required.

Container store 201 may thus be used for high volume product, for which it is typical for at least one full layer of product to be ordered. The full layer loading enables faster retrieval of high volume product than using a partial layer gantry system.

Pallets may be loaded onto conveyor 203 from one of two pallet loading conveyors 204, 205 or from another source generally referenced by arrows 206. A palletiser 207 is provided at the end of the conveyor 203 to load any additional containers onto the pallets. The pallets are then loaded out, as represented by arrow 208 and may then be transported to the customer.

A second conveying system 209 may extend substantially parallel to conveyor 203. The second conveying system 209 receives partial layers of containers from the container store 202. An overhead partial layer gantry system 500 is provided to remove partial layers of product. A suitable partial layer gantry system is provided by The ABB Group of Zurich, Switzerland. Alternative apparatus for partial layer picking from a horizontal pick face will be known or apparent to those skilled in the relevant arts.

The second container store 202 may contain lower volume product for which individual orders are routinely less than a full layer. High volume product may also be included in container store 202 to accommodate orders that are not multiples of the number of containers in a full layer. There are typically a large variety of lower volume products, and therefore, the partial layer gantry system 500 for container store 202 preferably is adapted to pick containers from any pallet over the upper surface of the container store 202.

Container stores 201 and 202 may have multiple gantry systems. Alternatively, a single gantry system may be used to provide both full and partial layer relocation. Furthermore, the full layer store and partial layer store may be mixed into a single area. Such variations on the layout of the container store(s) may be required for example depending on the required footprint dimensions of the storage and retrieval system.

Conveyor system 209 includes multiple conveyors, as represented by the multiple arrows along conveyor system 209 in FIG. 9. Each conveyor may be independently controlled by a controller such as a manager computer. The partial layer gantry system 500 loads containers onto one of the conveyors of conveyor system 209, usually the closest conveyor. To increase the efficiency of retrieval of the partial gantry system 500, it may retrieve partial layers out of order. In this case, the independently controllable conveyors are controlled to reorder the containers before they reach the palletiser.

For example, the orders may require loading by the palletiser of product from pallet P1, product from P2 and product from P3 in that order. It is inefficient for the partial layer gantry system 500 to retrieve product in that order as there is a large amount of travelling involved. Therefore, the gantry system 500 may retrieve containers from P1 and P3 and then P2. The conveying system 209 will hold the containers from P3 until the containers from P2 have passed by, thereby reordering the supply of containers to the palletiser.

In addition, a further holding system 210 to temporarily hold one or more containers may be provided to further increase the flexibility of the system. Holding system 210 may be required for example if containers from P1 and P3 have to be placed in the wrong order on the same conveyor of the conveying system 209. It will be appreciated by those skilled in the art that holding system 210 may be in a number of forms and is not necessarily a conveyor system as shown in FIG. 9. For example, the holding system may be a ram that pushes containers on and off the conveying system 209 as required.

In an alternative embodiment, conveyor 203 and conveying system 209 may be implemented together as a single conveyor. The reordering may then be reliant on the holding system 210 and/or the palletiser 207.

Once a pallet has been emptied of containers, a gantry system is used to remove the pallet. Preferably, the same gantry system used to load containers is used to remove pallets. Taking for example an instance where pallet P3 has become empty. The partial layer gantry system 500 removes the pallet P3, leaving a space in the second container store 202. Therefore, pallet P4 is moved into the space created by the removal of pallet P3 and pallet P5 is moved into the space created by the movement of pallet P4. This conveyance of containers may be achieved by a live racking system, whereby the pallets are biased towards the conveyor system 10 and released to roll or slide forward when require to fill a space. Alternatively, the containers may be actively conveyed, such as by a powered segmented conveyor engaged below the containers to be moved.

The movement of the pallets described above results in a space at the periphery of the partial pallet store where pallet P5 was previously located. As this space is at the periphery of the store, it is easily accessible. Using this system, the requirement for access roads or the like to the container store is reduced, as the pallets can be located close to each other, several layers deep. Therefore, more efficient use of the available floor area may result. This method may be applied to both the first and second container stores 201, 202.

It will be appreciated by those skilled in the art that the movement of pallets may be varied to create a space at any peripheral edge of the container store. Alternatively, the movement may be such that pallets may be loaded from only a single point. However, the movement mechanism required would be more complex to accommodate this movement.

To reduce the requirement for access to the sides of the storage and retrieval system, loading systems 211A and 211B may be provided. The loading systems run along the peripheral edge of the container store 201 or 202 where a space is to be created resulting from the removal of a pallet. Therefore, the loading system may be used to transport and load pallets into the container store 201 or 202. This results in a single external loading point for each store area, referenced by arrows L1 and L2 for container store 201 and container store 202 respectively.

Loading systems 211A and 211B may include index conveyors 212, 213 respectively that travel below the pallets. The index conveyors 212, 213, which are segmented to allow controlled movement of each pallet may move pallets into the space created by the removal of a pallet as well as load a new pallet at the periphery of the container store 201 or 202. The pallets are supported by elongate support members that extend along or near the edges of the pallets in the same way as containers are supported in the first embodiment. The index conveyors 212, 213 may then be raised up between the support members to engage the pallets, enabling them to be conveyed.

The loading systems 211A and 211B may each include an empty pallet receiving means 214 to receive empty pallets from the gantry system. The loading system 211A and 211B may then transport the empty pallets to a required location. Empty pallets may be transferred to the conveyor 203 for loading from container store 201. This may be facilitated via a suitable empty pallet loading means, such as conveyors 204 and 205.

Thus, the storage and retrieval system allows pallets to be located in close proximity to each other in the storage area, which may reduce the required footprint size of the system. The reordering function may increase the efficiency of the gantry system(s), resulting in higher throughput. Also, the reuse of pallets may reduce pallet handling requirements over known systems.

The operation of the gantry systems, conveyors, palletisers and loading systems may be controlled by suitable warehouse management software and a management computer. Such control methodologies and systems are well known in the art and therefore are not detailed herein.

Aspects of the first and second embodiments may be interchanged. For example, the second embodiment may replace the intermediate storage zone 40 and low-demand product zone 65. Containers from the bulk storage zone 27 may be transported onto conveyor 203 as indicated by arrows 206. The loading and gantry systems 400, 500 in the second embodiment may be replaced by transfer conveyors 45, 63 in the first embodiment and vice-versa. The index conveyors 212, 213 of the second embodiment may be replaced by transfer conveyors 45 that have a bend. Other variations and combinations will be apparent to those skilled in the relevant arts.

Where in the foregoing description reference has been made to specific components or integers having known equivalents, then such equivalents are herein incorporated as if individually set forth.

Although this invention has been described by way of example and with reference to possible embodiments thereof, it is to be understood that modifications or improvements may be made thereto without departing from the scope or spirit of the invention.

What is claimed is:

1. A container storage and retrieval system including:
a first storage zone storing containers of product in frames, each frame including a plurality of stacks of containers;
a second storage zone storing containers of product in rows of stacks;
a first automated retrieval system arranged and configured to retrieve selected stacks of containers from the second storage zone by moving complete stacks from the second storage zone to a conveyor without separating the complete stacks into partial stacks, and to replenish the second storage zone with at least one frame of containers from the first zone, wherein the at least one frame moves along the conveyor between the first storage zone and the second storage zone;
a third storage zone storing containers in partial stacks or stacks;
a second automated retrieval system arranged and configured to stack partial stacks together and to retrieve selected partial stacks or stacks of containers, and to replenish the third storage zone with at least one stack of containers from the second storage zone without separating the at least one stack into partial stacks; and
an order accumulation zone arranged and configured to collate orders wherein an order includes a required number of complete frames received from the first storage zone, a required number of complete stacks received from the second storage zone, wherein the complete stacks are not separated into partial stacks and the required number of complete stacks retrieved from the second zone is less than the number of stacks in a frame, and a required number of stacks or partial stacks received from the third zone.

2. The container storage and retrieval system of claim 1 wherein the first automated retrieval system further includes:
multiple parallel spaced-apart support members defining a plurality of rows and adapted to support a base of a plurality of containers; and
one or more index conveyors parallel to the rows, movable beneath the rows in a direction transverse to the rows, and including engagement means enabling engagement of the or each index conveyor with one or more stacks in a row to transport it or them longitudinally within that row during retrieval of containers from the second zone and replenishing of containers in the second zone.

3. The container storage and retrieval system of claim 1, wherein the first storage zone is arranged to allow manual retrieval of frames of containers stored therein.

4. The container storage and retrieval system of claim 1 including a fourth storage zone arranged to allow manual retrieval of individual items of product from the containers and integration of the items into an order.

5. The container storage and retrieval system of claim 1 including a manager computer including an inventory system for recording the flow and location of product within a controlled area defined by at least the second and third storage zones.

6. The container storage and retrieval system of claim 5, wherein the manager computer is operable to cause the container storage and retrieval system to replenish the third storage zone with one or more stacks of containers sourced from the second storage zone.

7. A method of container storage and retrieval including:
in a first storage zone, storing containers of product in frames, each frame including a plurality of stacks of containers;
in a second storage zone, storing containers of product in rows of stacks;
retrieving selected complete stacks of containers from the second storage zone using a first automated retrieval system by moving complete stacks from the second storage zone to a conveyor without separating the complete stacks into partial stacks, and replenishing containers by moving one or more frames from the first storage zone to the second storage zone, wherein moving frames from the first storage zone to the second storage zone includes moving the frames along the conveyor;
in a third storage zone, storing containers of product in partial stacks or stacks;
retrieving selected partial stacks or stacks of containers from the third storage zone using a second automated retrieval system which is arranged and configured to stack partial stacks together and to replenish containers by receiving stacks from the second storage zone without separating the stacks into partial stacks; and
collating orders by transferring a required number of complete frames from the first storage zone; a required number of complete stacks from the second storage zone, wherein the complete stacks are not separated into partial stacks, the required number of complete stacks retrieved from the second zone being less than the number of stacks in a frame; and a required number of stacks or partial stacks from the third zone.

8. The method of claim 7 including arranging the first storage zone for manual retrieval of containers stored therein.

9. The method of claim 7 including storing containers of product in a fourth storage zone arranged to allow manual retrieval of individual items of product from the containers and integration of the items into an order.

10. The method of claim 7 including using a manager computer including an inventory system for recording the flow and location of product within a controlled area defined by at least the second and third storage zones.

11. The method of claim 10 wherein the manager computer is operable to cause the container storage and retrieval system to replenish the third storage zone with one or more stacks of containers sourced from the second storage zone.

* * * * *